United States Patent [19]  [11] 4,104,487
Jacobson  [45] Aug. 1, 1978

[54] TELEPHONE ANSWERING DEVICE WITH REMOTE CONTROLLED PLAYBACK

[76] Inventor: Sava Jacobson, 8130 Orion St., Van Nuys, Calif. 91406

[21] Appl. No.: 749,676

[22] Filed: Dec. 13, 1976

[51] Int. Cl.$^2$ .............................................. H04M 1/64
[52] U.S. Cl. ................................... 179/6 E; 242/201; 179/6 R; 360/71; 360/74
[58] Field of Search .................... 242/201; 116/114 R, 116/114 J; 179/6 R, 6 E, 100.1 R, 100.1 DR; 360/71, 69, 137, 72, 74

[56] References Cited

U.S. PATENT DOCUMENTS

| | | | |
|---|---|---|---|
| 2,724,016 | 11/1955 | Van Deventer | 179/6 R |
| 3,067,289 | 12/1962 | Zimmermann | 179/6 R |
| 3,353,007 | 11/1967 | Combs | 235/61.11 |
| 3,632,899 | 1/1972 | Ban | 360/71 |
| 3,757,057 | 9/1973 | Fleming | 179/100.1 R |
| 3,780,226 | 12/1973 | Jacobson | 179/6 R |
| 3,818,141 | 6/1974 | Jacobson | 179/6 R |
| 3,909,537 | 9/1975 | Jacobson | 179/6 R |

*Primary Examiner*—Bernard Konick
*Assistant Examiner*—Alan Faber
*Attorney, Agent, or Firm*—Spensley, Horn & Lubitz

[57] ABSTRACT

In this telephone answering device, incoming messages are recorded on a tape that is wound onto a take-up reel. During such recording, an indicator wheel is rotated by a drive wheel that is geared to the take-up reel. An arm on the drive wheel engages a tab projecting from the indicator wheel to accomplish this rotation. Upon reception of a "beep" tone sent over the telephone line by the user who wishes to retrive his messages, the tape is rewound, causing counter-rotation of the drive wheel. The indicator wheel is held stationary. When rewind is complete, the tape is driven forward again to play out the recorded messages. This rotates the drive wheel forward until the arm touches the indicator wheel tab. An electrical circuit then is completed which terminates the operation, since all recorded messages have now been played back. Transfer between forward and reverse tape drive is accomplished by a motor driven spiral cam, the follower of which pivots the reel drive motor to the requisite forward or reverse position.

7 Claims, 8 Drawing Figures

TELEPHONE ANSWERING DEVICE WITH REMOTE CONTROLLED PLAYBACK

BACKGROUND OF THE INVENTION

1. Field of the Invention

The present invention relates to a telephone answering device which facilitates the remote controlled playback of recorded incoming messages.

2. Description of the Prior Art

Telephone answering devices automatically answer an incoming telephone call. Generally they include a ring detector which turns on the device in response to a ringing signal. An outgoing announcement, typically pre-recorded on a magnetic tape loop, is transmitted to the telephone line. This announcement may say that the user is not in, and request the caller to leave a message which will be recorded automatically. At the end of the outgoing announcement, the device is switched to a mode in which the incoming messages are recorded on a magnetic tape. When this recording is complete, the device shuts off automatically and returns to a stand-by condition in readiness to receive the next call. Such devices are typified by the inventor's U.S. Pat. Nos. 3,780,226 and 3,909,537.

In these devices, the user must return to the instrument to play back the recorded incoming messages. This is accomplished by first depressing a rewind button which mechanically conditions the device to rewind the incoming message tape. Next, a playback button is depressed which starts the tape in the forward direction, and turns on appropriate circuitry to play back the recorded messages via a loudspeaker contained in the instrument.

It is desirable to permit the user to recover the recorded incoming messages without having to return to the location of the answering device. An object of the present invention is to provide a telephone answering apparatus which facilitates such remote controlled operation. With the present invention, the user need only call his own telephone number from any telephone. After he hears the outgoing announcement, the user transmits a "beep" tone from a small oscillator that is held against the telephone handset microphone. The telephone answering device recognizes this specific "beep" tone, and switches to the automatic playback mode. The tape is rewound, and the recorded messages are then played back over the telephone line to the user. When all of the messages have been played out, the instrument resets itself to the answering mode, and shuts down in readiness to receive the next call.

To accomplish such remote controlled playback, the answering device must include certain facilities. These include: (a) circuitry to detect only the specific "beep" tone, (b) an indicator that "remembers" the number or time duration of the recorded messages, (c) means for rewinding the message tape, (d) means for then advancing the tape in the forward direction and conditioning the circuitry to transmit the recorded messages over the telephone line, and (e) means cooperating with the indicator to terminate the playback operation when all of the messages have been played out. It is a further object of the present invention to provide all of these facilities.

Another object of the present invention is to provide voice controlled timing of the incoming message record cycle. Thus, instead of requiring a fixed time for the recording of an incoming message, the inventive answering device will continue to record so long as uninterrupted speech is received.

Another object of the present invention is to provide an improved ring detector circuit.

SUMMARY OF THE INVENTION

These and other objectives are achieved by providing a telephone answering device with remote controlled playback. Incoming messages are recorded on a magnetic tape that is wound onto a take-up reel. During such recording, an indicator wheel is rotated by a drive wheel that is geared to the take-up reel. An arm on the drive wheel engages a tab that projects from the indicator wheel to accomplish this rotation. A set of numerals on the indicator wheel tells the user the total duration of time of the recorded incoming messages.

For remote controlled playback, the user transmits a "beep" tone over the telephone line. A "beep" detector utilizes a bridge-T filter in the feedback path of an operational amplifier. If the "beep" tone is at the frequency of this filter, the detector provides an output signal which sets a flip-flop to the automatic playout mode.

Setting of this flip-flop turns on a mechanism which transfers the tape reel drive motor from the forward to the reverse condition. This mechanism includes a spiral cam that is driven by a cam drive motor. As the cam rotates, a cam follower pivots the reel drive motor to the reverse position.

As the message tape is rewound, the indicator wheel remains in a fixed position. However, the drive wheel counter-rotates so that the arm moves away from the indicator wheel tab. At the end of rewind, a switch once again turns on the cam drive motor. The cam now is rotated further, so that the follower transfers the reel drive motor back to the forward position.

While the tape is driven forward, the recorded messages are played back over the telephone line. Various circuitry is conditioned by setting of the "beep" responsive flip-flop so as to facilitate this message playout.

As the tape is wound onto the take-up reel during message playout, the drive wheel again rotates in the forward direction. The drive wheel arm gradually approaches the indicator wheel tab. Both the arm and a section of the tab are electrically conductive. Since the tab was progressively moved to its present position during recording of all the incoming messages, the drive wheel arm will reach this tab when all of the recorded messages have been played out. When this occurs, an electrical circuit is closed by the contact of the arm with the tab. This circuit closure causes the flip-flop to be reset to the state in which the device operates normally to answer incoming calls. Such resetting of the flip-flop also terminates the remote controlled playout operation.

A unique voice responsive control circuit facilitates the recording of incoming messages for as long a time as uninterrupted speech is received from the telephone line. The circuit acts in conjunction with an audio amplifier having an automatic level control. This level control provides an output signal that is indicative of the amplitude envelope of the received speech. In the voice responsive control circuit, a capacitor is charged via a fixed resistor. When the charge level reaches a preselected value, an oscillator is turned on to produce a tone that indicates that the recording period has ended. This tone burst also is used to derive a turn-off signal that terminates the answering cycle.

The capacitor is shunted by a transistor which receives the voice envelope signal from the automatic level control. When this speech envelope exceeds a certain value, it turns on the transistor, and thereby discharges the capacitor. So long as interrupted speech is present, this operation prevents the capacitor from charging up to that level which will turn on the burst tone oscillator. Thus, continued speech reception will prevent the device from shutting down and will ensure continued recording of the incoming message.

BRIEF DESCRIPTION OF THE DRAWINGS

A detailed description of the invention will be made with reference to the accompanying drawings, wherein like numerals designate corresponding elements in the several figures.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention is best defined by the appended claims.

The inventive telephone answering device 10 (FIG. 1) is connected to a telephone line 11, 12 (FIG. 6) and functions automatically to answer calls received from that line. When a ring signal occurs, a ring detect circuit 13 (FIG. 6) connects power to the device 10 and turns on a motor 14 which drives a tape loop 15. A prerecorded outgoing message, typically indicating that the call is being answered automatically, is picked from the tape loop 15 by a playback head 16 (FIG. 1), amplified and transmitted to the telephone line.

Figure 1:
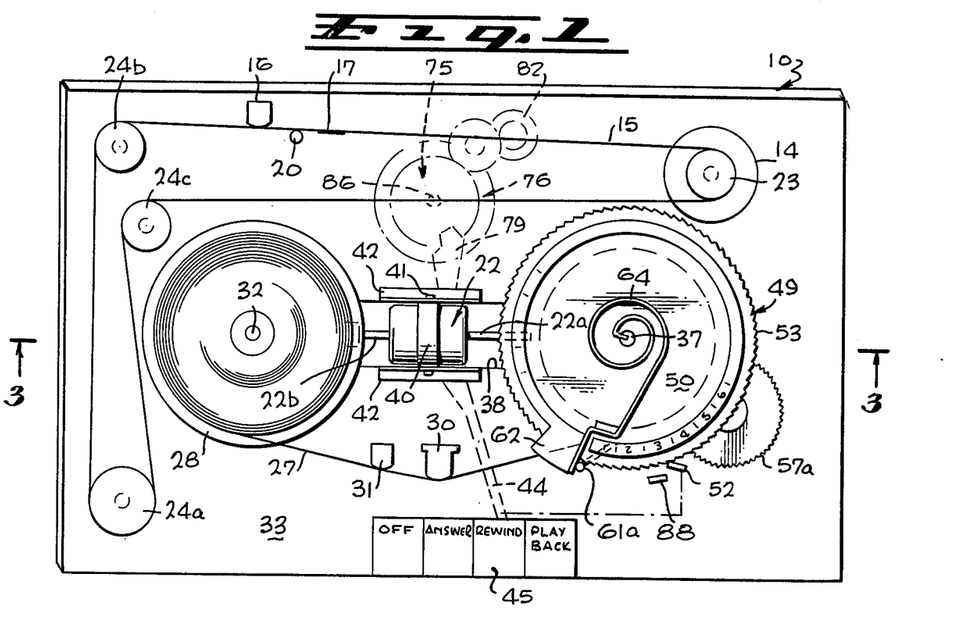
FIG. 1 is a top plan view of a telephone answering device in accordance with the present invention.

Advantageously, the tape loop 15 includes an electrically conductive strip 17. After transmission of the complete outgoing message, the strip 17 electrically shorts a pair of contacts 18, 19 (FIG. 6) that are supported on a terminal post 20 (FIG. 1). This causes a motor control flip-flop 21 to change state, thereby removing power from the loop drive motor 14 and applying power to an incoming message tape reel drive motor 22. The tape loop 15, which had been rotating about a drive pulley 23 and support pulleys 24a–24c, now remains stationary for the rest of the answering cycle.

As described to this point, the telephone answering mechanism is similar to that disclosed in the inventor's U.S. Pat. No. 3,909,537. That patent sets forth both the outcoming message tape loop configuration and the motor control flip-flop circuitry for alternately applying power to the loop drive motor and to the reel drive motor during the respective outgoing announcement and incoming message portions of the telephone answering cycle.

Figure 2:
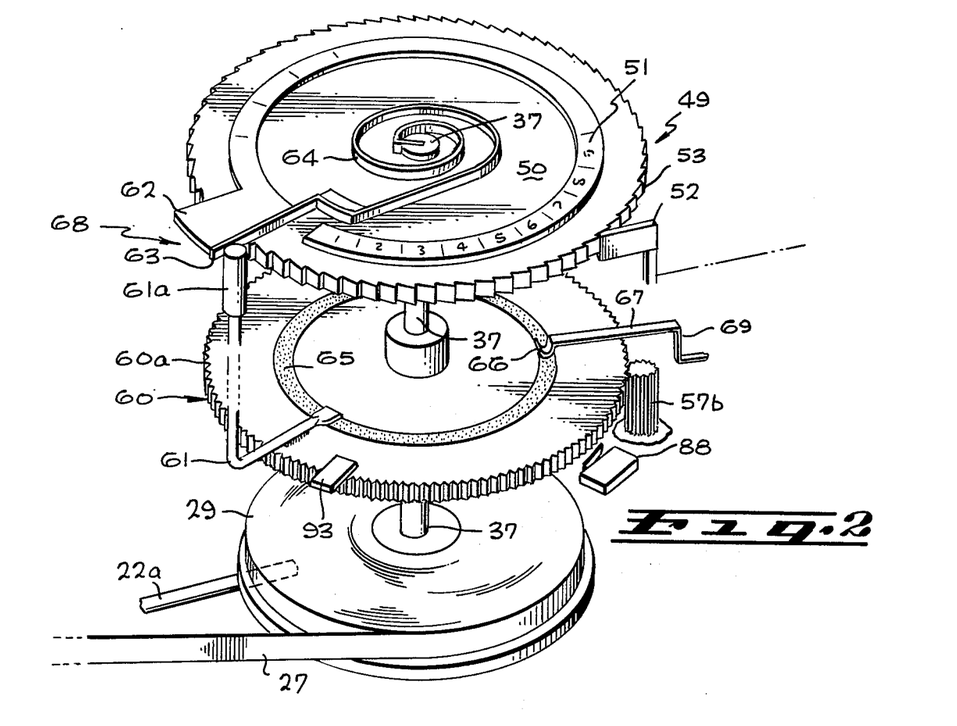
FIG. 2 is an exploded pictorial view of the incoming message indicator wheel and switch assembly utilized in the device of FIG. 1.
Figures 3, 4, 5, 8:
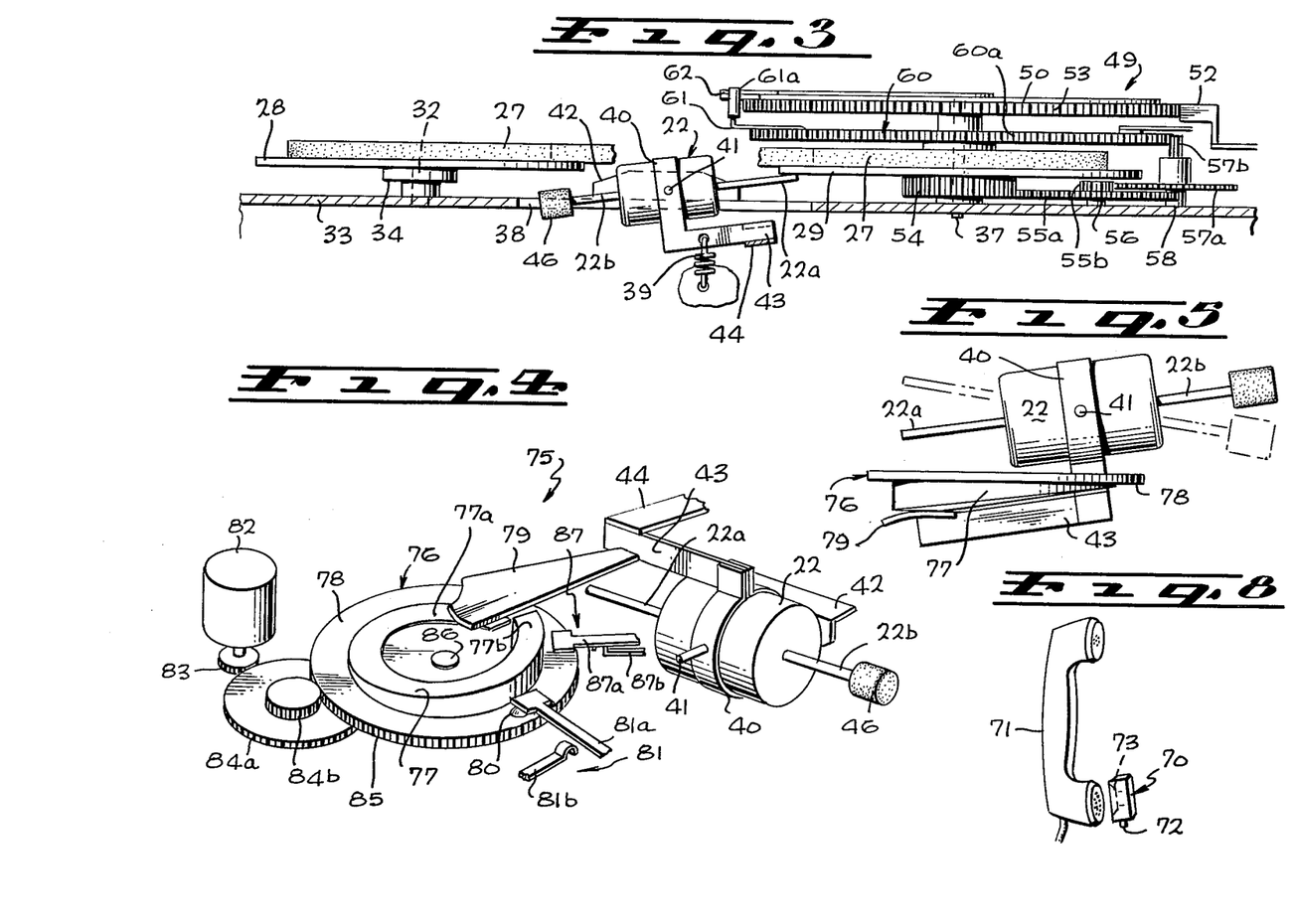
FIG. 3 is a side view of the incoming message tape drive assembly and of the message indicator wheel assembly, both as viewed on the line 3—3 of FIG. 1.
FIG. 4 is a pictorial view of the cam assembly used to tilt the incoming message tape drive motor from the forward to the reverse positions. The mechanism is shown "upside down", that is, as it would be seen when looking into the bottom of the telephone answering device of FIG. 1.
FIG. 5 is a partial side view of the cam mechanism of FIG. 4, as viewed on the line 5—5 thereof.
FIG. 8 is a pictorial view of a typical beep tone oscillator used for remote actuation of the telephone answering device of FIG. 1.

Referring now to FIGS. 1, 2 and 3, incoming message are recorded on a magnetic tape 27 which is wound from a supply reel 28 onto a take-up reel 29. As the incoming message is received, it is amplified and recorded on the tape 27 via a record/playback head 30. At the same time, any previously recorded material on the tape is erased by an erase head 31.

As seen in FIG. 3, the tape supply reel 28 is mounted to rotate about a shaft 32 which extends vertically above a horizontal chassis or mounting plate 33. A friction plate 34 of felt or like material damps the free rotation of the reel 28, so as to prevent the tape 27 from spilling off of the supply reel 28.

The take-up reel 29 is journal-mounted on a shaft 37 which extends vertically from the chassis 33. The reel drive motor 22 is pivotally mounted in an opening 38 through the chassis 33. A drive shaft 22a, 22b extends from both ends of the motor 22. A spring 39 normally biases the motor 22 to the tilted position shown in FIG. 3 wherein the shaft 22a contacts the undersurface of the take-up reel 29 so as to drive the tape 27 in the forward direction.

The pivotal mounting of the motor 22 includes a strap 40 that surrounds the motor housing, midway between the ends thereof. A pair of pivots 41 project laterally from the strap 40 through mounting holes in a respective pair of brackets 42. This arrangement facilitates tilting of the drive motor 22 about a horizontal axis that is perpendicular to the axis of the motor drive shaft 22a, 22b.

An arm 43 extends from the strap 40 parallel to, and in the same direction as the shaft 22a. This arm 43 is mechanically connected by a link 44 (FIG. 4) to a REWIND button 45 (FIG. 1) on the device 10. To rewind the tape 27 the rewind button 45 is depressed. By means of the link 44, this pivots the arm 43 downward (as viewed in FIG. 3) so as to tilt the motor 22 about the pivots 41 until a cylindrical member 46 at the end of the shaft 22b contacts the underside of the supply reel 28. This causes the supply reel to rotate in the rewind direction, at a rate which is greater than the rotation of the reel 29 in the forward direction. As described below in connection with FIG. 4, the motor 22 also is tilted to the rewind orientation, without depression of the REWIND button 45, in connection with the automatic, remote controlled playback of recorded messages.

The indicator wheel and switch assembly 49 of FIGS. 2 and 3 is used to give a visual indication of the total time that incoming messages have been recorded since the tape 27 last was rewound using the button 45. The assembly 49 also controls the extent to which the tape 27 is played back during remote controlled recovery of these messages. The assembly 49 includes an indicator wheel 50 that has a numbered scale 51 on its upper surface. As the reel 29 rotates counterclockwise to take up the tape 27 as a message is received, the wheel 50 rotates clockwise so that progressively increasing numerals on the scale 51 are visible beneath a window (not shown) in the cover of the device 10. Counter-rotation of the wheel 50 is prevented by a pawl 52 which engages a ratchet 53 around the periphery of the wheel 50.

The take-up reel 29 is free to rotate about the shaft 37. A gear 54 is affixed to the underside of the reel 29. This gear 54 drives a pair of gears 55a, 55b mounted on a shaft 56. These in turn drive another pair of gears 57a, 57b mounted on a shaft 58. The gear 57b drives the rim gear 60a of a driver wheel 60 (FIGS. 2 and 3). With this arrangement, as the reel 29 rotates counterclockwise to take up the tape 27, the driver wheel 60 is rim-driven in the clockwise direction.

The driver wheel 60 itself is journalled about the shaft 37 and includes an L-shaped arm 61 which projects radially beyond the periphery of the wheel 60. The arm 61 has a vertically upwardly extending section 61a of enlarged diameter which performs two functions. First, the arm end 61a engages a radially projecting tab 62 that is an integral part of the indicator wheel 50. As the wheel 60 is driven clockwise during take up of the tape 27, the arm 61 pushes against the tab 62 so as to drive the indicator wheel 50 in the clockwise direction. Thus the wheel 60 serves as the driver for the indicator wheel 50.

The second function of the arm 61 is utilized during remote-controlled playback of the recorded messages. In this mode, as the tape 27 is rewound onto the supply reel 28, the take-up reel 29 rotates in a clockwise direction, imparting counter-clockwise rotation to the driver wheel 60. The indicator wheel 50 remains stationary, since counterclockwise rotation is prevented by the pawl 52. After the tape has been rewound, forward tape drive begins again, as the recorded messages are played out. During this operation, the take-up reel 29 again rotates counterclockwise, imparting clockwise rotation to the driver wheel 60. The indicator wheel 50 remains stationary, since now the driver arm 61a is spaced some distance from the tab 62.

As the recorded messages are played out, the arm 61 will move toward the tab 62. Eventually, the arm end 61a will touch an electrical contact 63 situated on the edge of the tab 62. This happens just when all of the recorded messages have been played out, since the driver wheel 60, and hence the tape take-up reel 29, are now in the same position as they were at the end of recording of the last incoming message.

Figure 7:
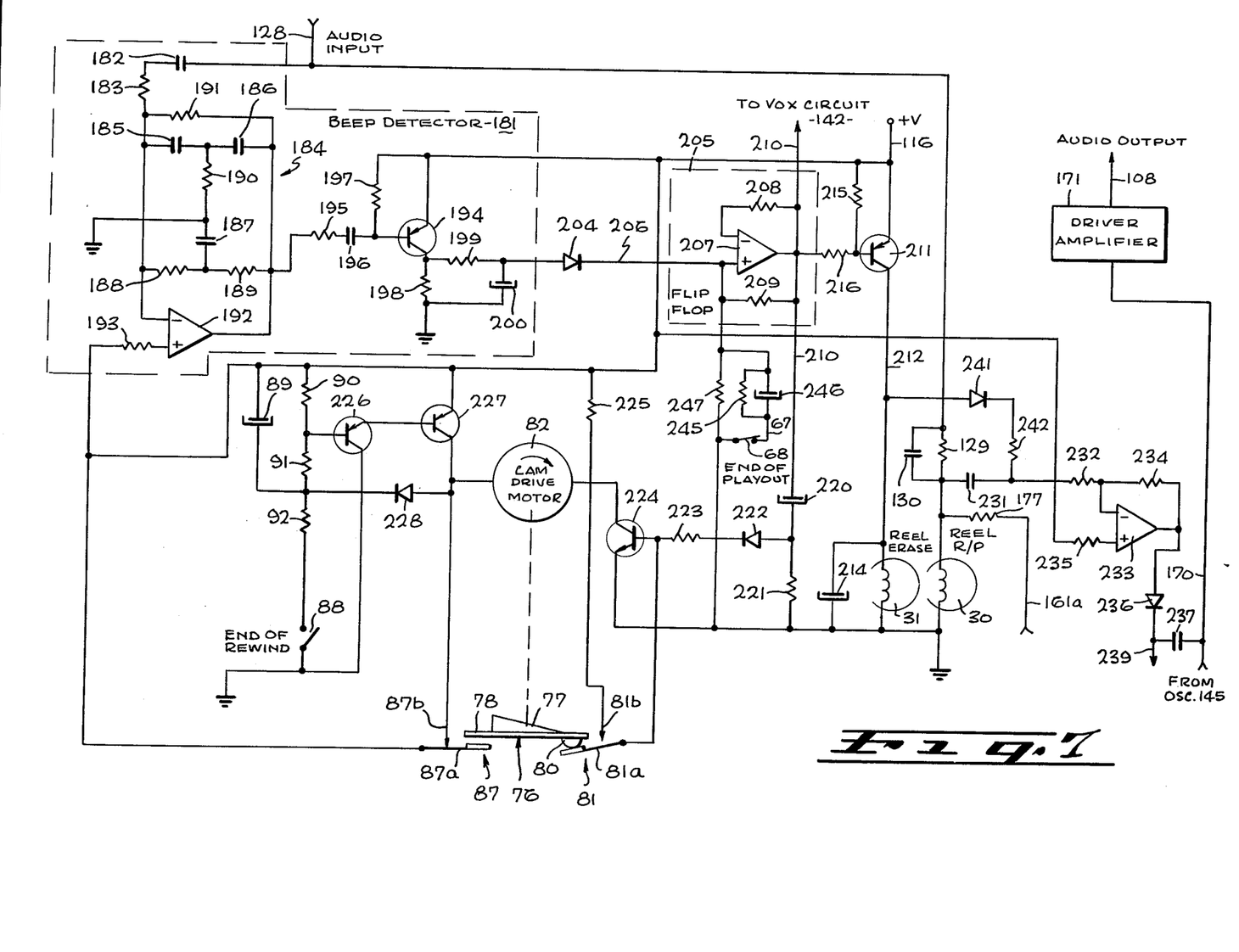
FIG. 7 is an electrical schematic diagram of the tone-responsive control circuitry for automatically playing back received messages under remote control.

An electrical signal is generated when the arm end 61a touches the contact 63. To this end, the contact 63 physically consists of the end of an electrically conductive coil spring 64, the other end of which is connected to the system electrical ground via the shaft 37 and the chassis 33. The arm 61 itself is connected to a commutator ring 65 on the upper surface of the driver wheel 60. A spring contact 66 affixed to an arm 67 touches the commutator ring 65 to complete the electrical circuit. Thus, the arm end 61a and the contact 63 together form an "end of playout" switch 68, the electrical connections to which are shown in FIG. 7. A bracket 96 supports the arm 67 mechanically. The spring 64 serves the additional function of returning the indicator wheel 50 to the starting position when the REWIND button 45 is depressed to release the pawl 52.

To initiate the remote-controlled playback of recorded messages, a "beep" tone is transmitted over the telephone line to the device 10. As shown in FIG. 8, this may be accomplished using an audio oscillator contained in a small hand-held package 70. The user dials the number of the telephone to which the device 10 is connected. He listens to the answering message transmitted from the tape loop 15. Then, instead of leaving a message to be recorded on the tage 27, the user holds the package 70 (FIG. 8) up to the microphone section of the telephone handset 71 that he is using. He pushes a button 72 which turns on an oscillator that drives a loudspeaker 73. This creates an audio "beep" tone which is transmitted via the telephone lines to the device 10. Appropriate electrical circuitry, described below in connection with FIG. 7, actuates a remote-controlled rewind mechanism 75 best shown in FIG. 4. This mechanism 75 tilts the reel drive motor 22 to the rewind position so as to rewind the tape 27. However, the mechanism 75 does not withdraw the pawl 52 (FIG. 2), so that the message indicator wheel 150 remains stationary and continues to indicate the amount of incoming message time that has been recorded. Upon completion of rewind, the mechanism 75 (FIG. 4) returns the reel drive motor 22 to the forward position, and appropriate electrical circuitry conditions the device 10 to play out the recorded messages to the caller. The remote-controlled playback terminates when the arm 61 touches the contact 63 to close the switch 68, as described in connection with FIG. 2.

The remote-controlled rewind mechanism 75 (FIGS. 4, 5 and 7) includes a cam 76 that is used to tilt the motor 22 from its normal forward position to the reverse position. To this end, the cam 76 includes a spiral cam surface 77 which projects from a planar disc 78. A cam follower 79 extends from the arm 43 attached to the motor strap 40, and engages the spiral cam surface 77.

In the position shown in FIGS. 4 and 7, the cam follower 79 is situated near the beginning 77a of the cam surface 77. In this orientation, the spring 39 pivotally biases the motor 22 into the forward position shown in FIG. 3. A boss 80 mounted on the disc 78 holds a switch 81 open by spreading a contact arm 81a away from the associated contact 81b.

Upon receipt and detection of the "beep" tone, a motor 82 is turned on. This motor 82 drives the cam 76 (in a clockwise direction as viewed in FIG. 4) by means of a set of gears 83, 84a, 84b and a gear 85 at the periphery of the cam disc 78.

As the cam 76 rotates about a shaft 86 affixed to the chassis 33, the cam follower 79 rides up the cam surface 77. This causes the motor 22 to pivot into the rewind orientation, as shown in FIG. 5. When the cam follower 79 is in this rewind position, the switch actuator boss 80 will be positioned so as to open a switch 87. That is, the boss 80 will spread the contact arm 87a away from the associated contact 87b.

Opening of the switch 87 will cause power to be removed from the motor 82 so as to keep the motor 22 tilted in the reverse position until all of the tape 27 has been rewound onto the supply reel 28. At that time, an "end of rewind" switch 88 (FIGS. 2 and 7) will close. After a delay of about two or three seconds, introduced by a network consisting of a capacitor 89 and resistors 90–92, the motor 82 again will be turned on. This will cause the cam 76 to be rotated sufficiently far so that the cam follower 79 "falls off" the end 77b of the cam surface 77. The spring 39 will cause the motor 22 to pivot back to the forward orientation. The motor 82 will keep turning until the switch actuator boss 80 again opens the switch 81, so as to stop the motor 82 and maintain the mechanism 75 in the position shown in FIG. 4 with the reel drive motor 22 in the forward position.

The open "end of rewind" switch 88 is closed by a tab 93 projecting from the driver wheel 60 (FIG. 2). The tab 93 is factory set so as to close the switch 88 when the tape is rewound from the reel 29. However, if the setting is slightly incorrect, the tape may not be completely rewound and part of a recorded message may be missed on playback. To prevent this, a two or three second delay is introduced in the actual termination of the rewind after the switch 88 is opened. The switch 88 may be actuated by the arm 61 rather than a separate tab 93.

Figure 6:
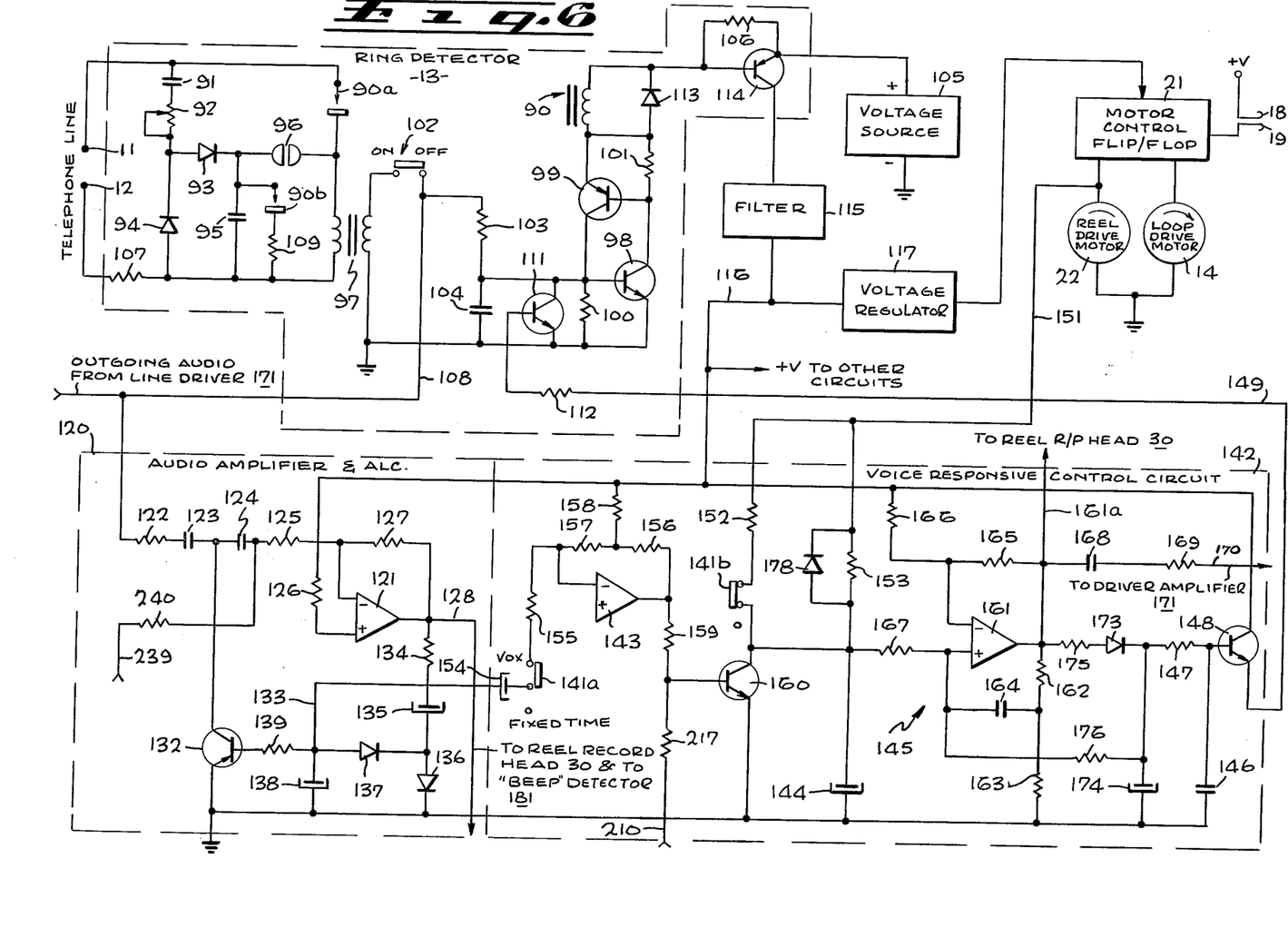
FIG. 6 is an electrical schematic diagram of the ring detector and voice responsive incoming message timing circuitry used in the telephone answering device of FIG. 1.

The ring detector 13 is shown in FIG. 6. This circuit includes a relay 90 which is actuated in response to a ring signal received on the telephone line 11, 12. The ring signal is applied to a voltage doubler circuit including a capacitor 91, a variable series resistor 92, a pair of diodes 93, 94 and a capacitor 95. The setting of the variable resistor 92 determines the rate at which the capacitor 95 is charged by the ring signal. Thus, the setting of this resistor 92 determines how many rings will occur before the call is answered by the device 10.

When the capacitor 95 is sufficiently charged so as to fire a neon bulb 96, the capacitor 95 will discharge through the neon bulb 96 and the primary of a transformer 97. The resultant control pulse, induced in the secondary of the transformer 97, is used to trigger a relay latching circuit including a pair of transistors 98 and 99.

Prior to occurrence of the trigger pulse from the transformer 97, both the transistors 98 and 99 are off. This is so since the emitter of each transistor 98, 99 is tied to the base of the same transistor via a respective resistor 100, 101. The trigger pulse is supplied via an on-off switch 102, a resistor 103 and a capacitor 104 to the base of the transistor 98. The resultant higher collector current to the transistor 98 creates a larger base current to the transistor 99. This in turn creates a larger collector current at the transistor 99 which reinforces the base drive to the transistor 98. The result is a very rapid turn on of the transistors 98, 99 with a resultant current flow that latches the relay 90.

The current to the coil of the relay 90 is supplied from the system voltage source 105 via a resistor 106 and the latching circuit including the transistors 98 and 99. When the relay 90 latches, a first relay contact 90a closes so as to connect the telephone line 11, 12 directly to the primary of the transformer 97 via a resistor 107. Thereafter, audio signals are transmitted to and from the telephone line 11, 12 via the transformer 97 and an audio line 108. The transformer 97 thus provides the dual role of transmitting both the starting impulse which triggers the relay 90 latch circuit and the audio signals. Advantageously, the transformer 97 has a relatively large insulation thickness between the primary and secondary windings so that there is very little interwinding capacitance.

The second relay contact 90b is used to discharge the capacitor 95 via a resistor 109. This ensures that there will be no accumulated charge on the capacitor 95 that might otherwise effect the ring responsiveness of the circuit 13 when the next call is answered. Note that there is no "latching contact" for the relay 90. Rather, the transistors 98, 99 act as the latching circuit and maintain the relay 90 closed until the end of the answering cycle. At that time, the circuit is turned off and the relay 90 released by shorting the base of the transistor 98 to ground via a transistor 111. To this end, a turn-off pulse is supplied via a resistor 112 at the end of each incoming message, as described below in connection with description of the voice responsive incoming message timing circuitry. Surge protection for the relay 90 is provided by a diode 113 connected across the relay coil.

Upon detection of a ring signal, when the relay 90 latches up, current through the resistor 106 causes turn-on of a transistor 114 that connects power from the system voltage source 105 via a filter 115 to the +V line 116. All of the other electrical circuits in the device 10 are powered from this voltage line 116. To ensure constant speed for the loop drive motor 14 and the reel drive motor 22, a voltage regulator 117 is used to regulate the voltage from the line 116 for supply to the motor control flip-flop 21 and thence to the motors 14 and 22.

Amplification of the incoming audio to a level appropriate for recording on the message tape 27 is accomplished by an audio amplifier and automatic level control (ALC) circuitry 120 (FIG. 6). Audio from the line 108 is applied to the input of an integrated circuit amplifier 121 via a network consisting of a resistor 122, a pair of capacitors 123, 124 and a resistor 125 all connected in series. Fixed dc bias is supplied to the other input of the amplifier 121 via a resistor 126. The amplifier gain is set by a feedback resistor 127 which typically is selected to provide a gain of roughly 50 db. The audio output from the amplifier 121 is supplied via a line 128, a resistor 129 (FIG. 7) and a capacitor 130 to the message tape record/playback head 30.

As the incoming audio thus is recorded on the message tape 27, automatic level control is achieved by means of a transistor 132, (FIG. 6) connected between ground and the junction of the capacitors 123 and 124. The transistor 132 acts as a variable resistance that changes the audio input level to the amplifier 121 in response to a voltage indicative of the envelope of the amplified audio signal. That envelope-indicative signal is obtained on a line 133 by rectifying the output of the amplifier 121 in a voltage doubler circuit consisting of a resistor 134, capacitor 135, a pair of diodes 136, 137 and a capacitor 138. The signal on the line 133, indicative of the envelope of the voice signal being received from the telephone line, is supplied via a resistor 139 to the base of the ALC transistor 132. The purpose for the network 122–125 is to ensure that the collector of the transistor 132 remains at dc ground potential. For this reason, the resistor 122 and capacitor 123 are selected to have essentially equal impedances as the capacitor 124 and the resistor 125. With this arrangement, Q9 acts as a true variable resistance in the input circuit to the amplifier 121, and provides automatic level control in response to the signal on the line 133 indicative of the voice envelope.

In the telephone answering device 10, there are two modes for determining how long the incoming message will be recorded on the tape 27. In the first mode, the recording continues as long as the caller is speaking. This voice responsive incoming message timing mode is selected by placing a switch 141a, 141b in the VOX position shown in FIG. 6. In the second mode, recording of incoming messages continues for a fixed time period. This mode is selected by positioning the switch 141a, 141b to the FIXED TIME position.

In the VOX mode, a voice responsive control circuit 142 (FIG. 6) receives the signal on the line 133 which is indicative of the envelope of the incoming speech. This signal is amplified by an integrated circuit amplifier 143 and used to control the discharging of a capacitor 144. Only in the absence of speech will the capacitor 144 charge up to a sufficiently high level so as to actuate an audio oscillator 145. This oscillator produces a tone which is transmitted to the telephone line to tell the caller that the recording of his incoming message has terminated. After a time period established by a capacitor 146 and a resistor 147, a transistor 148 produces a turn-off signal on a line 149 which terminates the answering cycle by turning on the transistor 111 and thereby turning off the latch transistors 98, 99 and deenergizing the relay 90.

The capacitor 144 is charged by the same regulated dc voltage that is supplied to the reel drive motor 22. This voltage is fed to the capacitor 144 via a line 151 and a pair of resistors 152, 153 that are connected in parallel during VOX operation. Typically, the values of the capacitor 144 and the resistors 152 and 153 are selected so that it takes about ten seconds to charge the capacitor 144 up to a level that will initiate oscillation of the oscillator 145 to terminate the answering cycle. However, if within this ten second period a voice syllable is received, the capacitor 144 will be discharged, and a new ten second charging period will begin. This discharging operation will continue as long as a voice signal is received.

To accomplish the discharging, the envelope-responsive signal on the line 133 is supplied via a capacitor 154 and a resistor 155 to the input of the amplifier 143. The gain of this amplifier 143 is controlled by the feedback resistors 156-158. The output of the amplifier 143 is fed via a resistor 159 to the base of a transistor 160 that is connected across the capacitor 144. With this arrangement, each time a speech syllable is received, a negative-going signal is produced on the line 133 at the leading edge of the syllabic waveform. This negative-going signal produces a corresponding positive-going signal via the resistor 159 that turns on the transistor 160. The capacitor 144 then is discharged through the collector-to-emitter path of the transistor 160. This arrangement takes advantage of the fact that for most speech sounds, a steeper transient occurs at the leading edge as compared with the trailing edge of each syllabic waveform.

The oscillator 145 consists of an operational amplifier 161, typically implemented by one section of a type LM3900 integrated circuit. Positive feedback to produce the oscillation is provided by dividing the amplifier output signal in a voltage divider consisting of a pair of resistors 162, 163. A positive feedback signal is supplied from this divider via a capacitor 164 to the non-inverting (+) input of the amplifier 161. The frequency of oscillation is established primarily by the value of the positive-feedback capacitor 164 and a resistor 165 that provides negative feedback for the amplifier 161. Current is provided to the inverting (−) input of the amplifier 161 via a resistor 166.

The oscillator 145 goes into oscillation when the capacitor 144 reaches a sufficiently high charge level, typically on the order of 1 volt. When this level is reached, enough current flows from the capacitor 144 via a resistor 167 into the non-inverting (+) input of the amplifier 161 to offset the negative current flowing through the feedback resistor 165. Oscillation begins, and a tone is transmitted to the telephone line via a capacitor 168, a resistor 169, a line 170, a driver amplifier 171 (FIG. 7) and the audio line 108. A consistent oscillation tone is ensured by using the initial output burst from the amplifier 161 to provide rapid high dc current drive to the non-inverting (+) input of the amplifier. This is accomplished by connecting the output via a diode 173, a capacitor 174 and a pair of resistors 175, 176 back to the (+) input. The tone is recorded on the tape 27 via a line 161*a*, a resistor 177 and the record head 30.

As noted above, the tone from the oscillator 145 serves both (1) to notify the caller that recording of his message has terminated and (2) to initiate the turn-off signal to terminate the answering cycle. In this regard, the values of the capacitor 146 and the resistor 147 are selected to establish the duration of time that the tone is transmitted to the caller prior to shut down of the device 10. Typically, this time is about one-fifth of a second. At the end of this time, the capacitor 146 has charged sufficiently to turn on the transistor 148 and thereby provide a voltage on the line 149 that turns on the transistor 111 so as to release the relay 90 to end the answering cycle. The transistor 114 turns off, disconnecting the voltage source 105 from the various circuits. Any residual charge on the capacitor 144 is discharged via a diode 178.

Note that the tone generated by the oscillator 145 will be fed back into the audio amplifier and ALC circuit 120. It is possible that the leading edge of this tone may produce a signal on the envelope-responsive line 133 that could discharge the capacitor 144. However, this will not delay turn off of the device 10, since once the oscillator 145 has gone into oscillation, the turn off signal on the line 149 will always be generated. Similarly, any incoming voice signal that occurs after the beginning of oscillation will not prevent the turn-off of the device 10.

In the fixed-time mode of operation, the switch 141*a* will be open so as to prevent the envelope related signal from reaching the amplifier 143. Therefore, the transistor 160 will never conduct to discharge the capacitor 144. The switch 141*b* is open, so that the capacitor 144 is charged only through the resistor 153. Thus, the incoming message recording time is determined entirely by the RC charging time of the capacitor 144 via the resistor 153. The values of these components are chosen to provide a typical incoming recording time of say thirty seconds. Once the capacitor 144 has charged to a nominal 1 volt level, the oscillator 145 goes into oscillation, producing the end-of-message-recording tone, and causing the transistor 148 to produce the shut-down pulse on the line 149.

Circuitry for controlling the automatic remote-controlled playback of recorded incoming messages is shown primarily in FIG. 7. Referring thereto, a "beep" detector 181 is used to sense the presence of a "beep" tone transmitted to the device 10 using e.g., the package 70 shown in FIG. 8. The beep detector 181 is operative during the incoming message receive portion of the answering cycle, and receives the incoming audio from the amplifier 120 via the line 128.

This incoming audio is supplied via a capacitor 182 and a resistor 183 to a bridge-T filter 184 consisting of three capacitors 185-187 and three resistors 188-190. The bridge-T filter 184 is shunted by a resistor 191 slightly to broaden the passband. The filter 184 is situated in the negative feedback path of an operational amplifier 192, the non-inverting input to which receives a fixed bias via a resistor 193.

With this arrangement, the amplifier 192 exhibits very high gain only at the null frequency of the bridge-T filter 184. Thus, only if the "beep" frequency from the package 70 (FIG. 8) is exactly at the null frequency of the filter 184, will the amplifier 192 provide a sine wave output. If the "beep" tone is at some other frequency, no output will be provided.

Assuming that the proper "beep" frequency is present, the sine wave from the amplifier 192 is supplied to the base of a transistor 194 via a resistor 195 and a capacitor 196. The emitter of the transistor 194 is connected to the base by a resistor 197, and a resistor 198 connects the collector to ground. With this arrangement, the transistor 194 acts as a detector or rectifier for the input sine wave. The transistor 194 normally is non-conducting, as there is no forward bias applied. Each time the sine wave exceeds a threshold of one polarity, the transistor 194 is driven into conduction. As a result, there appears at the collector of the transistor 194 a series of pulses which are integrated by a network consisting of a resistor 199 and a capacitor 200.

If the "beep" tone continues for a sufficient duration of time, typically three seconds, the capacitor 200 will charge to a sufficiently high voltage so as to provide, via a diode 204, a dc signal of sufficient magnitude to change the state of a bi-stable flip-flop circuit 205. Switching of the circuit 205 initiates the automatic rewinding and subsequent playback to the telephone line of messages recorded on the tape 27. This automatic playback is not initiated by normal voice signals received from the telephone line, even though those voice signals do reach the input to the beep detector 181. It is possible that occasionally the voice signal will include a component at the frequency of the bridge-T filter 184. Even though the amplifier 192 may produce an output in that instance, it would not be of sufficiently long time duration to charge the capacitor 200 to a level that would switch the flip-flop 205. Remote playback actuation only will occur when exactly the correct "beep" tone is used, and this tone is maintained on long enough to change the capacitor 200 sufficiently to switch the flip-flop 205.

In the flip-flop 205, the signal from the beep detector 181 is connected via a line 206 to the non-inverting input of an operational amplifier 207. Both negative and positive feedback are provided to the amplifier 207 via respective resistors 208, 209, the former being of substantially higher value than the latter. With this arrangement, the output 210 of the amplifier 207 normally is close to ground potential. When the signal from the "beep" detector 181 is received, the amplifier 207 flips to the state in which the output line 210 is at the system +V potential.

One function of the flip-flop 205 is to turn off the erase head 31 during remote-controlled rewind and playback of the recorded messages. To this end, the erase head 31 normally is driven by current supplied via a transistor 211, a line 212 and a resistor 213. A capacitor 214 shunts the erase head 31.

When the device 10 is conditioned to record incoming messages, the flip-flop 205 is in its normal state in which the output 210 serves as a current sink for current drawn through a pair of resistors 215 and 216. The junction of these resistors 215, 216 is connected to the base of the PNP transistor 211, so that the transistor 211 is held on. Current flows to the erase head 31 which functions to erase the tape 27 prior to the recording thereon of new incoming messages.

When a "beep" is detected, the flip-flop 205 switches to the state in which the output 210 is at +V potential. This immediately turns off the transistor 211, thereby rendering inoperative the reel erase head 31. Tape rewind and playback then can occur without erasing the messages contained thereon.

The output 210 of the flip-flop 205 also is connected via a resistor 217 (FIG. 6) to the base of the transistor 160 in the VOX circuit 142. As a result, when the flip-flop 205 changes state, the +V signal at the output 210 is supplied to the base of the transistor 160 to turn it on. This maintains the capacitor 144 in a discharged state, thereby preventing the circuit 142 from turning off the device 10 while the recorded messages are placed back under remote control. Switching of the flip-flop 205 also initiates the automatic rewinding of the message tape 27 by means of the rewind mechanism 75 described above in connection with FIG. 4.

To this end, when the flip-flop 205 changes state, the +V potential appears across a capacitor 220 and a resistor 221. The resultant pulse that appears at the junction of these components is provided via a diode 222 and a resistor 223 to the base of a transistor 224. Accordingly, the transistor 224 momentarily goes on, so as to provide a current path through the motor 82. The current path is from the +V line 116 through the closed switch 87, through the motor 82 and through the collector-to-emitter path of the transistor 224 to ground. As soon as the motor 82 starts rotating the cam 76, the boss 80 moves away from the switch contact 81a so as to close the switch 81. This connects the +V source via a resistor 225 and the closed switch 81 to the base of the transistor 224, thereby holding the transistor 224 on to maintain rotation of the motor 82.

When the cam 76 has rotated around to the rewind position, the boss 80 will open the switch 87, thereby disconnecting power from the motor 82. As discussed above in connection with FIG. 4, the reel drive motor 22 now is tilted so as to drive the supply reel 28, and thereby rewind the tape 27.

When the message tape 27 is completely rewound, the "end of rewind" switch 88 (FIG. 2) will close. After a delay introduced by the RC network consisting of the capacitor 89 and the resistors 90–92, a transistor 226 will be turned on, which in turn will drive a transistor 227 into conduction. This completes a current path through the motor 82 beginning from the +V line 116, through the transistor 227, the motor 82 and the transistor 224 to ground. The transistor 224 is still on, since the switch 81 is closed when the cam 76 is in the rewind position. The motor 82 begins to rotate, turning the cam 76 sufficiently so that the cam follower 79 drops off of the cam end 77b, thereby returning the reel drive motor 22 to the forward condition. Rotation of the cam 76 terminates when the boss 80 once more opens the switch 81. This removes the bias from the base of the transistor 224, turning off that transistor and opening the circuit to the motor 82. A diode 228 ensures discharge of the capacitor 89.

As the message tape 27 now is driven forward by the motor 22, the messages recorded thereon are picked up by the record/playback head 30. The audio signal is supplied via a capacitor 231 (FIG. 7) and a resistor 232 to the input of an amplifier 233. The gain of the amplifier 233 is established by a negative feedback resistor 234. Positive bias is provided to the non-inverting input of the amplifier 233 via a resistor 235. The amplifier audio output is supplied via a diode 236 and a capacitor 237 to the line 170. From there, it is amplified by the driver amplifier 171 and supplied to the audio output via the line 108.

During this remote-controlled playback of the recorded messages, the audio amplifier 120 must be disabled. This is accomplished by using the dc level present at the output of the amplifier 233 to bias off the integrated circuit amplifier 121. To this end, the output of the diode 236 is connected via a line 239, a resistor 240 (FIG. 6) and the resistor 125 to the inverting input of the amplifier 121. The supplied dc level forces the amplifier 121 into cutoff a low output, thereby inhibiting operation of the amplifier circuit 120.

During normal operation, when incoming messages are recorded on the tape 27, the amplifier 233 is inhibited so as to prevent the incoming message from being fed back out to the telephone line. To this end, the line 212 from the transistor 211 is connected via a diode 241, a resistor 242 and the resistor 232 to the inverting input of the amplifier 233. Thus, when the transistor 211 is on and supplying bias voltage to the reel erase head 31, a +V voltage also is supplied via the diode 241 to the amplifier 233. This forces the amplifier 233 into cutoff, thereby inhibiting its operation as an audio amplifier.

As the messages on the tape 27 are played out in remote-controlled operation, the driver wheel 60 (FIG. 2) is rotating counterclockwise. When all of the messages have been played out, the arm 61a will touch the contact 63 to close the switch 68. As a result, the flip-flop 205 will be switched back to its normal mode. This occurs by shunting a resistor 245 and a discharged capacitor 246 (FIG. 7) across the resistor 247 connected from the non-inverting input of the amplifier 207 to ground. When the switch 68 is closed, this input terminal is effectively connected to ground potential because there is no charge on the capacitor 246. As a result, the flip-flop 205 switches back to the original state that is used during call answering operation, with the output line 210 at ground potential.

The device 10 thereafter will shut itself off in the following manner. When the flip-flop 205 reverts to the original state, the line 210 is at ground potential. As a result, the bias supplied via the resistor 217 (FIG. 6) to the transistor 160 will terminate, and the transistor 160 will switch off. Since no voice is coming from the telephone line, the transistor 160 will remain off, permitting the capacitor 144 to charge up to a level sufficient to actuate the oscillator 145. As described above, this causes the transistor 148 to produce a shut-off signal on the line 149 to turn off the device 10. The device 10 then is in condition to answer the next incoming call.

Intending to claim all novel, useful and unobvious features, shown or described, the inventor claims:

1. In a telephone answering device of the type including means for automatically playing back incoming messages that have been previously recorded on tape, and having a reel drive motor that is positionable alternately to a forward position for driving the incoming message tape in the forward direction and a reverse position for rewinding the incoming message tape, said automatic playback means comprising:

a cam including a generally planar disc and a generally circular cam surface atop a surface of said disc, said cam surface raising gradually above said disc surface from a low end relatively near said disc surface to a high end that is spaced away from said disc surface, a cam drive motor mounted to rotate said cam about an axis perpendicular to said disc, a cam follower arm having a first end resting against said cam surface and the other end connected to position said reel drive motor in accordance with the angular orientation of said cam, first circuitry for energizing said cam drive motor in response to an automatic playback control signal so that said motor drives said cam from a first angular orientation in which said follower arm positions said reel drive motor in the forward tape drive direction to a second angular orientation in which said follower arm positions said reel drive motor in the reverse tape drive direction, and second circuitry for energizing said cam drive motor in response to a rewind complete signal indicating that the message tape has been rewound completely, so that said motor drives said cam from said second angular orientation to said first angular orientation.

2. A telephone answering device according to claim 1, wherein said follower arm rests against the low end of said cam surface in said first angular orientation and rests against said high end in said second angular orientation, and wherein said cam drive motor always drives said cam in the same rotational direction, said first circuitry causing said cam drive motor to rotate said cam in a direction such that said follower arm rides up said cam surface, and to stop rotation of said cam with said follower arm resting against said high end, said second circuitry causing said cam drive motor to rotate said cam further in the same rotational direction so that said follower arm falls off said cam surface high end and down to said low end.

3. A telephone answering device according to claim 2 further comprising first and second switches operated by said cam when said cam is in said first and second angular orientations respectively, said first and second switches being used by said second and first circuitry respectively to deenergize said cam drive motor and thereby terminate rotation of said cam when said cam reaches the desired orientation.

4. A telephone answering device according to claim 3 wherein said first circuitry comprises:

a first transistor connected to supply power to said cam drive motor when said first transistor is on, said power further being supplied to said cam drive motor via said second switch which is closed except when said cam is in said second orientation with said reel drive motor in said reverse tape drive direction, said first transistor receiving turn-on bias voltage via said first switch which is closed except when said cam is in said first orientation with said reel drive motor in said forward tape drive direction, said automatic playback control signal being supplied to the base of said first transistor to turn said first transistor on momentarily, thereby supplying power to said cam drive motor for enough time so that said motor rotates away from said first orientation sufficiently to close said first switch, said first transistor thereby being biased on by the bias voltage supplied via said first switch, said cam drive motor continuing to receive power and to rotate said cam until said cam reaches said second orientation whereupon said second switch is opened to disconnect power from said cam drive motor.

5. A telephone answering device according to claim 4 wherein said second circuitry comprises:

a second transistor connected across said second switch, said second transistor normally being off, said rewind complete signal biasing on said second transistor so as to provide power to said cam drive motor to rotate said cam away from said second orientation and to said first orientation, the resultant opening of said first switch removing bias from said first transistor and thereby deenergizing said cam drive motor.

6. A telephone answering device according to claim 1 wherein said second circuitry includes a delay circuit connected to delay said rewind complete signal so that said cam drive motor begins to drive said cam from said second angular orientation to said first angular orientation in delayed response to occurrence of said rewind complete signal.

7. A telephone answering device of the type including means for automatically playing back incoming messages that have been previously recorded on tape, and having a reel drive motor that is mechanically positionable alternately to forward and reverse tape drive positions by an assembly comprising:

a motor positioning cam, a cam follower cooperating with said cam and connected to position said drive motor in accordance with the orientation of said cam, a cam drive motor for driving said cam between first and second orientations in which the cam follower positions said reel drive motor respectively in said forward and reverse positions.

first circuit means for energizing said cam drive motor in response to occurrence of an automatic playback control signal and for maintaining said cam drive motor energized only long enough to rotate said cam from said first orientation to said second orientation so as to position said reel drive motor in said reverse position, and second circuit means, including an end of rewind switch actuated when all of said tape has been rewound, for energizing said cam drive motor upon actuation of said end of rewind switch and for maintaining said cam drive motor energized only long enough to rotate said cam from said second orientation back to said first orientation so as to position said reel drive motor in said forward position.

* * * * *